(12) United States Patent
Zhang

(10) Patent No.: US 11,316,913 B2
(45) Date of Patent: *Apr. 26, 2022

(54) SENDING AND REQUESTING FEED

(71) Applicant: INTERNATIONAL BUSINESS MACHINES CORPORATION, Armonk, NY (US)

(72) Inventor: Ling L. Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,015

(22) Filed: Sep. 8, 2017

(65) Prior Publication Data

US 2017/0374129 A1    Dec. 28, 2017

Related U.S. Application Data

(63) Continuation of application No. 13/435,704, filed on Mar. 30, 2012, now Pat. No. 9,762,644.

(30) Foreign Application Priority Data

Mar. 31, 2011    (CN) .............. 201110091510

(51) Int. Cl.
*H04L 29/08*    (2006.01)
*H04L 67/02*    (2022.01)
(Continued)

(52) U.S. Cl.
CPC .............. *H04L 67/02* (2013.01); *H04L 67/30* (2013.01); *H04L 67/34* (2013.01)

(58) Field of Classification Search
CPC ......... H04L 67/02; H04L 67/30; H04L 67/34; H04L 29/08
(Continued)

(56) References Cited

U.S. PATENT DOCUMENTS 7,818,659 B2    10/2010    Khan et al.
9,762,644 B2    9/2017    Zhang
(Continued)

FOREIGN PATENT DOCUMENTS

| CN | 101188653 A | 5/2008 |
| CN | 101268461 A | 9/2008 |
| CN | 101420325 A | 4/2009 |

OTHER PUBLICATIONS

Wu, W.G. et al., "RSS Made Easy, A Basic Guide for Librarians," Medical Reference Services Quarterly, vol. 26, No. 1, pp. 37-50, Jan. 1, 2007.
(Continued)

*Primary Examiner* — Sibte H Bukhari
(74) *Attorney, Agent, or Firm* — Cuenot, Forsythe & Kim, LLC

(57) ABSTRACT

A server or other computing device can receive a request for a feed (e.g., Really Simple Syndication, Atom, or other Extensible Markup Language format feed) from a client. Content of the requested feed and a type of the client can be determined. Executable processing logic can be added into the requested feed according to the determined content of the feed and the type of the client. The feed into which the executable processing logic has been added can be sent to the client.

12 Claims, 5 Drawing Sheets

(51) Int. Cl.
*H04L 67/00* (2022.01)
*H04L 67/30* (2022.01)

(58) Field of Classification Search
USPC ........................................................ 709/203
See application file for complete search history.

(56) References Cited

U.S. PATENT DOCUMENTS

| | | | |
|---|---|---|---|
| 2005/0267973 A1 | 12/2005 | Carlson et al. | |
| 2007/0022174 A1* | 1/2007 | Issa | H04L 67/104 709/217 |
| 2007/0168367 A1 | 7/2007 | Dickinson et al. | |
| 2008/0126476 A1* | 5/2008 | Nicholas | G06Q 10/10 709/203 |
| 2008/0141139 A1* | 6/2008 | Murren | H04L 29/06 715/744 |
| 2008/0195483 A1* | 8/2008 | Moore | G06Q 10/10 705/14.69 |
| 2008/0256213 A1 | 10/2008 | Carrier et al. | |
| 2008/0306972 A1* | 12/2008 | Wilkin | H04L 51/066 |
| 2010/0106770 A1* | 4/2010 | Taylor | H04L 67/303 709/203 |
| 2010/0263027 A1 | 10/2010 | Yin et al. | |
| 2011/0119571 A1 | 5/2011 | Decker et al. | |
| 2011/0125829 A1* | 5/2011 | Finley | G06F 16/9535 709/203 |
| 2012/0254299 A1 | 10/2012 | Zhang | |

OTHER PUBLICATIONS

U.S. Appl. No. 13/435,704, Non-Final Office Action, dated Sep. 30, 2013, 11 pg.
U.S. Appl. No. 13/435,704, Final Office Action, dated Feb. 20, 2014, 12 pg.
U.S. Appl. No. 13/435,704, Non-Final Office Action, dated Jun. 24, 2014, 12 pg.
U.S. Appl. No. 13/435,704, Final Office Action, dated Dec. 3, 2014, 13 pg.
U.S. Appl. No. 13/435,704, Examiner's Answer, dated Nov. 19, 2015, 19 pg.
U.S. Appl. No. 13/435,704, Decision on Appeal, dated Jan. 18, 2017, 7 pg.
U.S. Appl. No. 13/435,704, Notice of Allowance, dated May 4, 2017, 10 pg.

* cited by examiner

SENDING AND REQUESTING FEED

CROSS-REFERENCE TO RELATED APPLICATIONS

This application claims priority to the Chinese Patent Application Serial No. 201110091510.0 entitled "SENDING AND REQUESTING FEED", filed Mar. 31, 2011.

BACKGROUND

The present invention relates to the technical field of sending and requesting a feed, and more specifically, to technology of sending and requesting a feed into which processing logic has been added.

With the massive propagation of message and information via networks and personalized customization demands of network users on different kinds of information, feeds are widely applied. In brief, a feed, as a standard-formatted information outlet that is provided to satisfy the requirement for continuous self-updates in a certain form, is a data exchange specification for online news, blogs, and other Web content. Content providers/distributors provide feeds so that users may subscribe to the provided feeds. Sometimes a feed is aggregated by a plurality of feeds. A typical application scenario of feeds is that a content provider publishes a feed link on its website, and a user may register by using an aggregator program (as also called a "feed reader" or a "news reader") running on his/her local machine. In this scenario, such operation for the user is quite simple, just like directly dragging into the aggregator the feed link published by the content provider. Subsequently, the aggregator checks whether the updated content is provided on a server of its feed list, and if there is updated content, the aggregator may then mark or directly download the updated content. The aggregator may be set to periodically check whether the feed has updated content. A feed may have various specific formats, such as a Really Simple Syndication (RSS) (i.e., resource description framework site summary) feed, an Atom feed, or other Extensible Markup Language (XML) format-based feed. Any formatted feed may satisfy the extensible markup language XML specification.

BRIEF SUMMARY

Embodiments of disclosure provide a method or system for sending/requesting a feed that is capable of satisfying the rapid increase of business applications and frequent and rapid changes of processing logic. Embodiments of the disclosure provide a method or system for sending/requesting a feed that is capable of adapting to the change of processing logic without a need of updating a client or a feed reader of the client.

According to one aspect of the disclosure, there is provided a method of sending a feed, comprising: receiving from a client a request for a feed; determining content of the requested feed and a type of the client; adding executable processing logic into the requested feed according to the determined content of the feed and the type of the client; and sending to the client the feed into which the executable processing logic has been added.

According to one aspect of the disclosure, there is proposed a system for sending a feed, comprising: receiving means configured to receive from a client a request for a feed; determining means configured to determine the content of the requested feed and the type of the client; adding means configured to add executable processing logic into the requested feed according to the determined content of the feed and the type of the client; and sending means configured to send to the client the feed into which the executable processing logic has been added.

According to one aspect of the disclosure, there is provided a method of requesting a feed, comprising: sending to a server a request for a feed; and receiving a feed from the server, the received feed containing executable processing logic, the executable processing logic having been added by the server according to determined content of a feed and a type of a client that requests the feed.

According to one aspect of the disclosure, there is provided a system for requesting a feed, comprising: sending means configured to send to a server a request for a feed; and receiving means configured to receive from the server a feed, the received feed containing executable processing logic, the executable processing logic having been added by the server according to determined content of a feed and a type of a client that requests the feed.

With embodiments of the method and system of the disclosure, because the processing logic is collectively controlled and managed on a server from a client or a feed reader of the client, and executable processing logic is added into a feed provided to the client, it is possible to achieve the object of sending/requesting a feed while satisfying the rapid increase of business applications, and frequent and rapid changes of processing logic. Furthermore, it is possible to achieve the object of sending/requesting a feed while adapting to the change of processing logic without a need of updating the client or the feed reader of the client.

DETAILED DESCRIPTION

Figure 1:
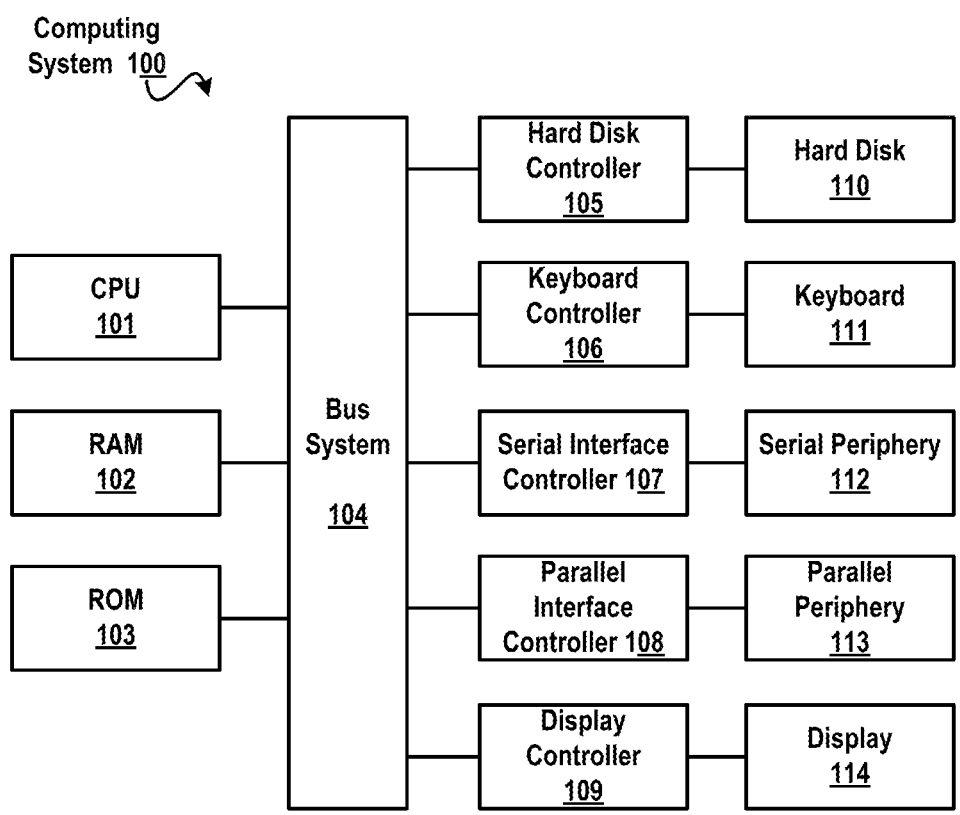
FIG. 1 illustrates a block diagram of an exemplary computing system adapted to implement the embodiments of the present invention.

In addition to allowing ordinary users to subscribe to information like news, feeds are widely used in business applications. In business applications, a feed reader of a client triggers a specific workflow and performs a specific operation based on the content of a subscribed feed. For example, the following is business operation logic for triggering a specific workflow: "if the feed content contains server error information, then a feed reader sends an email to report this error upon reading the relevant information." However, a problem lies in how to implement and process such processing logic.

The prior art has proposed a technical solution for addressing the foregoing problem: adding a plug-in containing business processing logic into a feed reader of a client that requests a feed, such that the plug-in analyzes the received feed content, and performs the specific operation as specified by the processing logic based on the processing logic contained in the plug-in itself and the received specific feed content.

However, a disadvantage in the foregoing prior art solution is that if processing logic changes, then a plug-in deployed in a feed reader of a client has to be updated according to types of different clients. Since a large number of aggregated feeds exist and the processing logic may change quite frequently and rapidly, it is difficult to satisfy such change requirements by updating a feed reader of a client in real time. In addition, the cost of updating all clients for a change of processing logic will be enormous.

The present disclosure overcomes the shortcoming of prior art solutions. In one embodiment of the disclosure, a server or other computing device can receive a request for a feed (e.g., Really Simple Syndication, Atom, or other Extensible Markup Language format feed) from a client. Content of the requested feed and a type of the client can be determined. Executable processing logic can be added into the requested feed according to the determined content of the feed and the type of the client. The feed into which the executable processing logic has been added can be sent to the client.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to the figures, FIG. 1 illustrates a block diagram of an exemplary computing system 100 in which embodiments of the present invention may be implemented. As illustrated, the computer system 100 may comprise: a CPU (Central Processing Unit) 101, RAM (Random Access Memory) 102, ROM (Read Only Memory) 103, a system bus 104, a hard disk controller 105, a keyboard controller 106, a serial interface controller 107, a parallel interface controller 108, a display controller 109, a hard disk 110, a keyboard 111, a serial peripheral device 112, a parallel peripheral device 113 and a display 114. Among these devices, the CPU 101, the RAM 102, the ROM 103, the hard disk controller 105, the keyboard controller 106, the serial interface controller 107, the parallel interface controller 108, and the display controller 109 are coupled to the system bus 104; the hard disk 110 is coupled to the hard disk controller 105; the keyboard 111 is coupled to the keyboard controller 106; the serial external device 112 is coupled to the serial interface controller 107; the parallel external device 113 is coupled to the serial interface controller 108; and the display 114 is coupled to the display controller 109. It is to be understood that the structural block diagram illustrated in FIG. 1 is merely illustrative rather than limiting the scope of the present invention. Some devices may be added or omitted according to circumstances.

Figure 2:
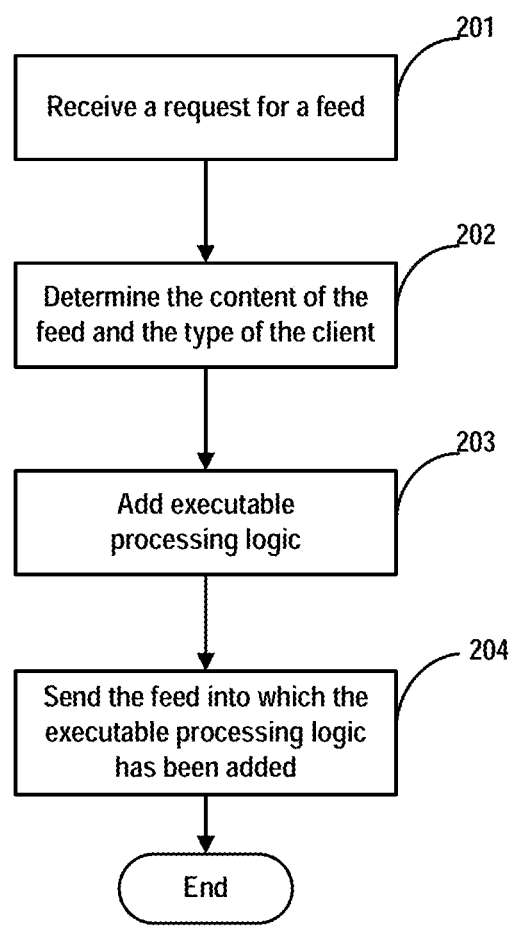
FIG. 2 illustrates a flowchart of a method of sending a feed according to one embodiment of the present invention.

FIG. 2 illustrates a flowchart of a method of sending a feed according to one embodiment of the present invention.

The method illustrated in FIG. 2 starts with step S201 in which a request from a client for a feed is received. It should be noted that in this specification, client and server are concepts in a feed requesting/providing environment. Specifically, a "client" refers to a computing node or application requesting a feed, which itself may be a terminal client node or a server node that provides services to subordinate clients. By contrast, a "server" refers to a computing node or application that provides or sends a feed. Usually (but not limited to), a request from a client for a feed is sent via a network to a server in the form of an HTTP request, e.g., http://www.aa.com/connections/blogs/feed/home/entries/atom?lang=en. It is to be understood that the request received in step 201 may be a request coming from a client periodically that has been subscribed to the feed to query whether a content update exists in the feed.

Next in step 202, the content of the requested feed and the type of the client are determined. Specifically, according to one embodiment of the present invention, the content of the feed is obtained from a feed content server according to a network link (e.g., a URL address) of the feed that is contained in the received request. The type of the client refers to the type of a client node or application, including, but not limited to, a client a browser or an email client software like Internet Explorer® (trademark registered by Microsoft Company), Lotus Notes® (trademark registered by International Business Machine Company) or Mozilla Thunderbird® (identification registered by Mozilla® Fund), a third-party application requesting a feed like Google Reader® (trademark registered by Google Company), and any other possible application subscribing to/requesting a feed. The reason for determining a type of the client is that for the same feed content, different types of clients need to execute different processing logic. For example, supposing the feed's content contains server error information and the type of the client is Lotus Notes® email client software, thus the processing logic is to make Lotus Notes send an email indicative of a server error to a system administrator. If the type of the client is Mozilla Thunderbird® email client software, then processing logic is to create a dialog box. Further, even if the same operation (processing logic) needs to be performed on different types of clients, expressions and corresponding executable codes of processing logic required by different types of clients are still different, thus the processing logic has to be added specifically for different types of clients in a subsequent step (see the description of step 203).

Next, the method illustrated in FIG. 2 proceeds to step 203. In step 203, executable processing logic is added into the requested feed according to the determined content of the feed and the type of the client. The added executable processing logic mentioned here is processing logic that is specially customized based on the content of the feed and the type of the client. According to one embodiment of the present invention, the executable processing logic is generated based on the predetermined processing logic. The purpose of adding executable processing logic into the feed is to enable the feed to be run by the client that requests the feed, so as to perform an operation that is determined in the processing logic. Below is first presented an instance of a predetermined processing logic that is generated for a Lotus Notes® client with respect to the feed RSS Datastream. The predetermined processing logic may be abstractly and literally expressed below: "if a type of a client is Lotus Notes® and the content of the attribute record of the feed RSS Datastream is 'welcome," then the message "Hello World' are displayed on the Lotus Notes client." On a server, the predetermined processing logic may be expressed in the form of code as below:

```
if (httpRequest.userAgent == 'Lotus Notes') {
    for (rssDataStream.records) {
        if (record.status == 'welcome') {
            rssDataStream.insertCode ("Sub Initialize");
            rssDataStream.insertCode ("Print ""Hello World""");
            rssDataStream.insertCode ("End Sub");
            break;
        }
    }
} else {
    return; // no matched feed reader found
}
rssDataStream.sendReponse ( ); // XML feed data returned to feed reader
```

According to one embodiment of the present invention, the above predetermined processing logic is a pre-saved processing logic that is not directly executable, and a processing logic for saving multiple types of clients with respect to the same feed content. In this manner, once a type of the client requesting the feed is determined in step 202, the corresponding processing logic can be added into the feed in step 203. Below is presented an instance of the feed into which executable processing logic that is generated according to the above exemplary predetermined processing logic has been added (the type of the client is Lotus Notes®):

```
<?xml version="1.0" encoding="utf-8"?>
<feed xmlns="http://www.aa.org/2005/Atom"
    xmlns:app="http://www.aa.org/2007/app"
    xmlns:snx="http://www.bb.com/xmlns/prod/sn"
    xmlns:os="http://a3.com/-/spec/opensearch/1.1/"
    xmlns:xhtml="http://www.aa.org/1999/xhtml"
    xmlns:thr="http://cc.org/syndication/thread/1.0">
...
    <id>https://www.aa.com/connections/activities/service/atom2/
activities</id>
        <title type="text">Activity Dashboard for Ling Zhang</title>
        <updated>2010-11-25T16:53:34Z</updated>
        <author>
            <name>BB AA</name>
            <email>BBAA@aa.com</email>
        <snx:userid>e6ea83c0-8f0a-1028-86b2-
db07163b51b2</snx:userid>
        </author>
...
    <script type='lotusscript'>
    Sub Initialize
    Print "Hello World"
    End Sub
    </script>
...
</feed>
```

In the above instance, the content below <script type='lotusscript'> is the added executable processing logic for the Lotus Notes® client. For the purpose of exemplary illustration, below is presented another instance of the feed into which executable processing logic has been added for a Mozilla Thunder® client (also based on the feed content wherein the content of the attribute record of the feed RSS Datastream is "welcome"). It should be noted that a non-directly executable processing logic for the Mozilla Thunder® client is also set and saved in advance, which is not illustrated here for the purpose of conciseness.

```
<?xml version="1.0" encoding="utf-8"?>
<feed xmlns="http://www.aa.org/2005/Atom"
    xmlns:app="http://www.aa.org/2007/app"
    xmlns:snx="http://www.bb.com/xmlns/prod/sn"
    xmlns:os="http://a3.com/-/spec/opensearch/1.1/"
    xmlns:xhtml="http://www.aa.org/1999/xhtml"
    xmlns:thr="http://cc.org/syndication/thread/1.0">
...
<id>https://aa.com/connections/activities/service/atom2/activities</id>
    <title type="text">Activity Dashboard for Ling Zhang</title>
    <updated>2010-11-25T16:53:34Z</updated>
    <author>
        <name>BB AA</name>
        <email>BBAA@aa.com</email>
        <snx:userid>e6ea83c0-8f0a-1028-86b2-
db07163b51b2</snx:userid>
    </author>
...
<script type='xul'>
    <window id="main" title="My App" width="300" height="300"
xmlns="http://www.mozilla.org/keymaster/gatekeeper/there.is.only.xul">
        <caption label="Hello World"/>
        <separatod>
        <button label="More >>" oncommand="showMore( );"/>
        <separator/>
    </window>
</script>
...
</feed>
```

In the above instance, content below <script type='xul'> is the added executable processing logic for the Mozilla Thunderbird® client. The meaning of the processing logic is that a window pops up that has a label of "Hello World," with the parameters of the window being a width of 300 and a height of 300.

Those skilled in the art would understand that as instances have been presented above for Lotus Notes® and Mozilla Thunderbird® clients based on a specific feed format, the foregoing specific code does not form any limitation to or explanation for the present invention. Based on the above-presented instances and with knowledge of the technical solution of the present invention, those skilled in the art would readily use various kinds of feed formats (e.g., Atom and RSS, etc.) and add corresponding executable processing logic with respect to various possible types of client and the content of feed. According to one embodiment of the present invention, in step 203, according to the determined content of the feed and the type of each of a plurality of clients that request the feed, corresponding processing logic is added into the same requested feed, respectively, so as to generate, based on the same feed and for the plurality of clients, a plurality of feeds into which the executable processing logic has been added. For example, if each of a plurality of clients requests the same feed, then executable processing logic corresponding to the plurality of clients may be added into the feed; and in step 204 the feed into which the executable processing logic has been added is sent to the clients, respectively.

The method illustrated in FIG. 2 then proceeds to step 204. In step 204, the feed into which the processing logic has been added is sent to the client that requests the feed. According to one embodiment of the present invention, the feed into which the executable processing logic has been added is for running by the client such that the client may perform a specific operation as specified by the processing logic. For example, the above two exemplary feeds into which executable processing logic has been added are sent to the Lotus Notes® client and the Mozilla Thunderbird® client, respectively, such that these clients may perform respective operations as specified in <script>.

Accordingly, by adding, when providing the feed, executable processing logic according to the specific content of the feed and the type of the client requesting the feed, the client can, upon receiving the feed, directly perform a specific operation as specified by the processing logic without a need of setting the processing logic and performing judgment on the clients or to updating the clients one by one in case of any change of the processing logic, so as to satisfy the rapid increase of business applications and frequent and rapid changes of processing logic.

Figure 3:
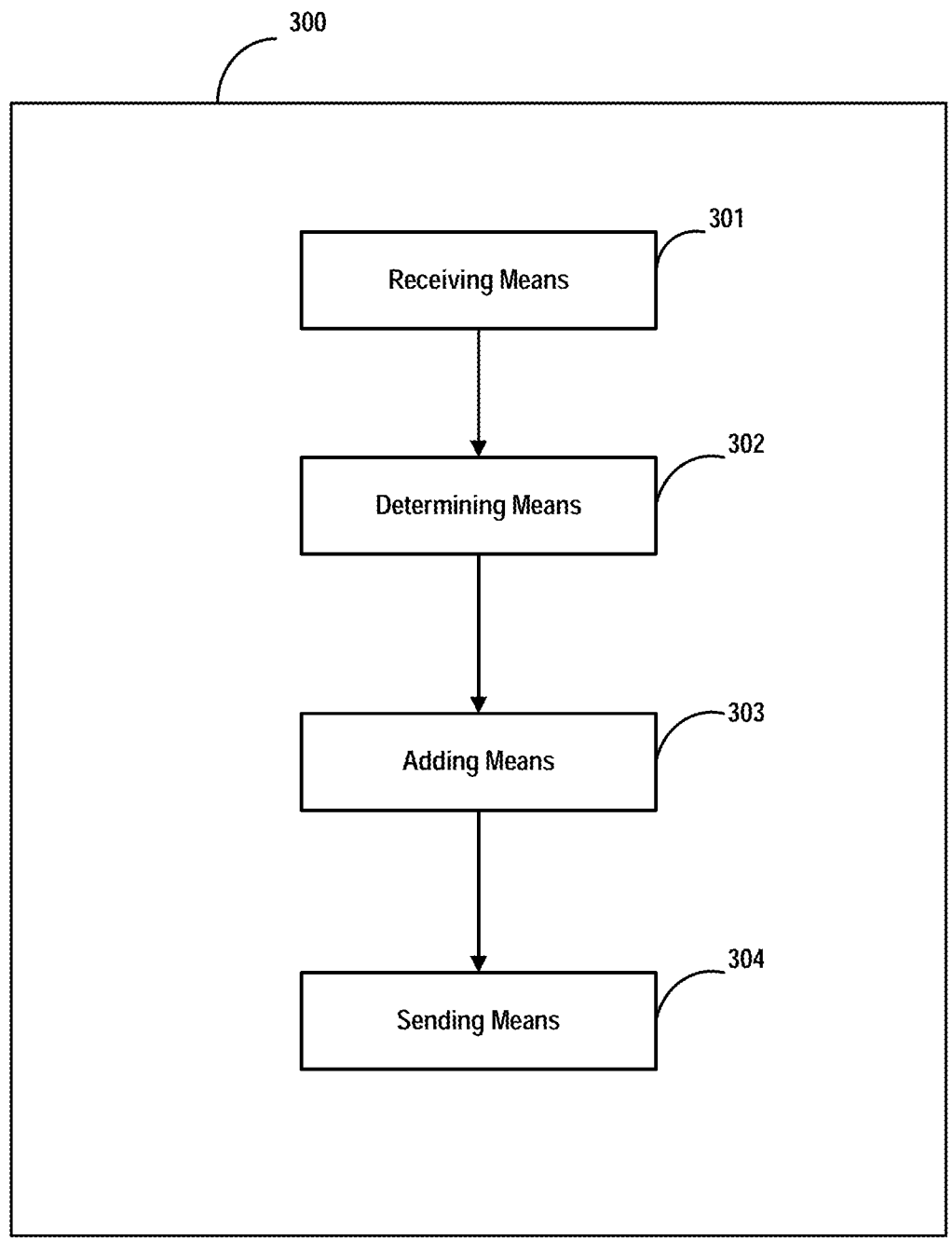
FIG. 3 illustrates a block diagram of a system for sending a feed according to one embodiment of the present invention.

FIG. 3 illustrates a block diagram of a system for sending a feed according to one embodiment of the present invention. The system illustrated in FIG. 3 is generally denoted by 300. Specifically, the system 300 comprises: receiving means 301 configured to receive from a client a request for a feed; determining means 302 configured to determine the content of the requested feed and the type of the client; adding means 303 configured to add executable processing logic into the requested feed according to the determined content of the feed and the type of the client; and sending means 304 configured to send to the client the feed into which the executable processing logic has been added. It is to be understood that the means 301-304 in the system illustrated in FIG. 3 correspond to steps 201-204 of the method illustrated in FIG. 2, respectively, so they are not detailed here.

Figure 4:
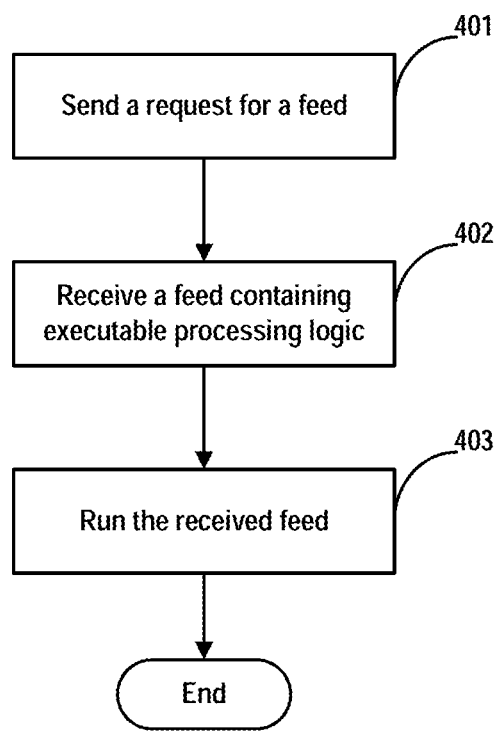
FIG. 4 illustrates a flowchart of a method of requesting a feed according to one embodiment of the present invention.

FIG. 4 illustrates a flowchart of a method of requesting a feed according to one embodiment of the present invention. The method illustrated in FIG. 4 starts with step 401 in which a request for a feed is sent to a server. Usually (but not limited to), a request for a feed is sent via a network to a server in the form of an HTTP request. It is to be understood that the request sent in step 401 may be a request to periodically query whether a content update in the feed exists.

The method then proceeds to step 402 of receiving a feed from the server, the received feed containing executable processing logic, the processing logic having been added by the server according to the determined content of the feed and the type of the client that requests the feed. Since the received feed contains executable processing logic and the executable processing logic is added with respect to the type of the client that requests the feed, the feed containing the executable processing logic may be run in step 403 so as to perform a specific operation specified by the processing logic. According to one embodiment of the present invention, the executable processing logic is generated according to predetermined processing logic. Accordingly, by running the feed containing the executable processing logic, the client can directly perform a specific operation specified by the processing logic upon receiving the feed, without a need of setting a processing logic and performing judgment on the clients or updating the client one by one in case of any change of the processing logic, so as to satisfy the rapid increase of business applications and frequent and rapid changes of processing logic. It should be noted that step 403 is not indispensable to the method illustrated in FIG. 4, because even if the feed containing the executable processing logic is not really run, the effects and objects of the present invention may be achieved so long as such a feed is received.

Figure 5:
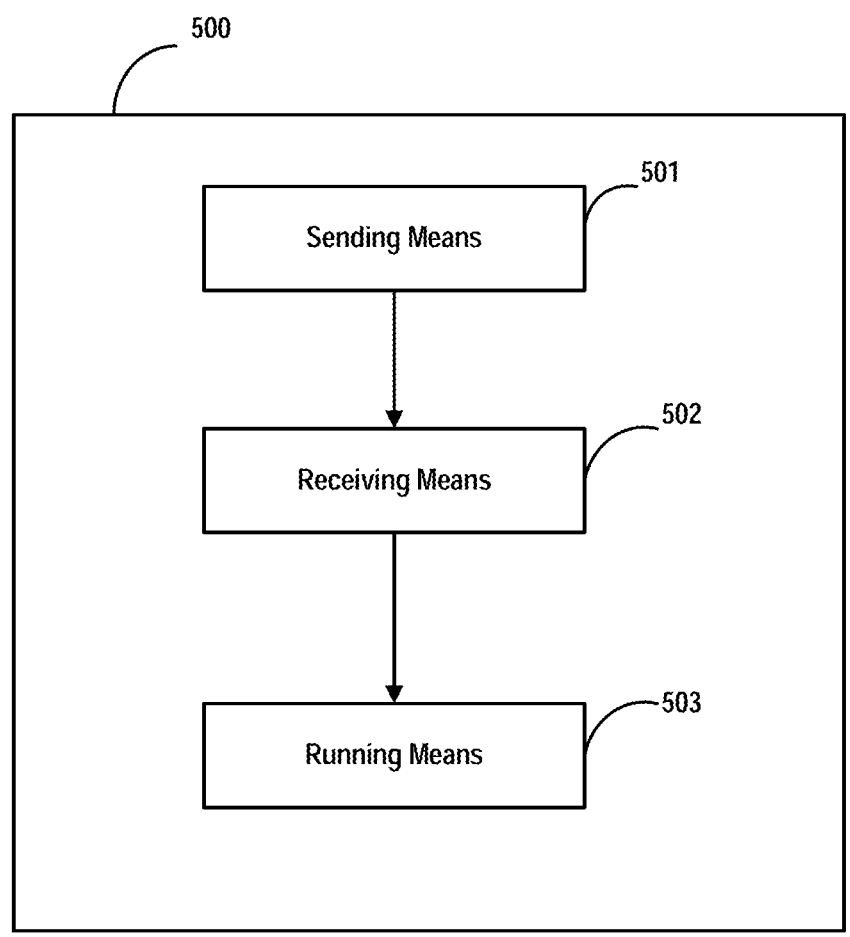
FIG. 5 illustrates a block diagram of a system for requesting a feed according to one embodiment of the present invention.

FIG. 5 illustrates a block diagram of a system for requesting a feed according to one embodiment of the present invention. The system illustrated in FIG. 5 is generally denoted by 500. Specifically, the system 500 comprises: sending means 501 configured to send to a server a request for a feed; receiving means 502 configured to receive the feed from the server, the received feed containing executable processing logic, the executable processing logic having been added according to the determined content of the feed and the type of the client that requests the feed; and running means 503 configured to run the feed that contains the executable processing logic, so as to perform a specific operation specified by the processing logic. It is to be understood that means 501-503 in the system 500 illustrated in FIG. 5 correspond to steps 401-403 of the method illustrated in FIG. 4, respectively, so they are not detailed here.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented method, comprising:
    receiving, from a client, a request for a feed;
    identifying, in response to the request, content of the requested feed and a type of the client;
    adding, based upon the identified content and the type, executable processing logic into the requested feed; and
    sending, to the client and in response to the request, the feed in which the executable processing logic has been added, wherein
    the client is an application that requests the feed,
    the type of the client is a type of the application that requests the feed,
    the executable processing logic is selected based upon the type of the application that requests the feed,
    the client running the feed causes the client to perform a specific operation specified by the processing logic, and
    the executable processing logic is generated according to predetermined processing logic.

2. The method of claim 1, wherein
    for a plurality of clients requesting the feed, corresponding executable processing logic is added into the feed to generate a plurality of feeds into which the executable processing logic has been added.

3. The method of claim 2, wherein
    the plurality of feeds into which the executable processing logic has been added are sent, respectively, to the plurality of clients request the feed.

4. The method of claim 1, wherein a format of the feed is one of:
    a Really Simple Syndication (RSS) feed, an Atom feed, or a feed based on an Extensible Markup Language (XML) format.

5. A computer hardware system, comprising:
    a hardware processor programmed to initiate the following executable operations:
    receiving, from a client, a request for a feed;
    identifying, in response to the request, content of the requested feed and a type of the client;
    adding, based upon the identified content and the type, executable processing logic into the requested feed; and
    sending, to the client and in response to the request, the feed in which the executable processing logic has been added, wherein
    the client is an application that requests the feed,
    the type of the client is a type of the application that requests the feed,
    the executable processing logic is selected based upon the type of the application that requests the feed,
    the client running the feed causes the client to perform a specific operation specified by the processing logic, and
    the executable processing logic is generated according to predetermined processing logic.

6. The system of claim 5, wherein
    for a plurality of clients requesting the feed, corresponding executable processing logic is added into the feed to generate a plurality of feeds into which the executable processing logic has been added.

7. The system of claim 6, wherein
    the plurality of feeds into which the executable processing logic has been added are sent, respectively, to the plurality of clients request the feed.

8. The system of claim 5, wherein
    a format of the feed is one of:
    a Really Simple Syndication (RSS) feed, an Atom feed, or a feed based on an Extensible Markup Language (XML) format.

9. A computer program product, comprising:
    a hardware storage device having stored therein computer readable program code,
    the computer readable program code, which when executed by a computer hardware system, causes the computer hardware system to perform:
    receiving, from a client, a request for a feed;
    identifying, in response to the request, content of the requested feed and a type of the client;
    adding, based upon the identified content and the type, executable processing logic into the requested feed; and sending, to the client and in response to the request, the feed in which the executable processing logic has been added, wherein the client is an application that requests the feed, the type of the client is a type of the application that requests the feed, the executable processing logic is selected based upon the type of the application that requests the feed, the client running the feed causes the client to perform a specific operation specified by the processing logic, and the executable processing logic is generated according to predetermined processing logic.

10. The computer program product of claim 9, wherein for a plurality of clients requesting the feed, corresponding executable processing logic is added into the feed to generate a plurality of feeds into which the executable processing logic has been added.

11. The computer program product of claim 10, wherein the plurality of feeds into which the executable processing logic has been added are sent, respectively, to the plurality of clients request the feed.

12. The computer program product of claim 9, wherein a format of the feed is one of:

a Really Simple Syndication (RSS) feed, an Atom feed, or a feed based on an Extensible Markup Language (XML) format.

* * * * *